(12) United States Patent
Yuan et al.

(10) Patent No.: US 11,546,075 B2
(45) Date of Patent: Jan. 3, 2023

(54) METHOD AND DEVICE FOR PILOT SEQUENCE TRANSMISSION

(71) Applicant: ZTE Corporation, Guangdong (CN)

(72) Inventors: Zhifeng Yuan, Guangdong (CN); Jianqiang Dai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 170 days.

(21) Appl. No.: 16/644,956

(22) PCT Filed: Sep. 6, 2017

(86) PCT No.: PCT/CN2017/100712
§ 371 (c)(1),
(2) Date: Mar. 5, 2020

(87) PCT Pub. No.: WO2019/047060
PCT Pub. Date: Mar. 14, 2019

(65) Prior Publication Data
US 2021/0036796 A1    Feb. 4, 2021

(51) Int. Cl.
*H04J 13/00* (2011.01)
*H04W 76/11* (2018.01)
(Continued)

(52) U.S. Cl.
CPC ....... *H04J 13/0048* (2013.01); *H04J 11/0036* (2013.01); *H04J 13/12* (2013.01); *H04W 76/11* (2018.02)

(58) Field of Classification Search
None
See application file for complete search history.

(56) References Cited

U.S. PATENT DOCUMENTS

| 7,177,265 B1 | 2/2007 | Schaffner |
| 2005/0084000 A1* | 4/2005 | Krauss ............... H04B 7/068 375/148 |

(Continued)

FOREIGN PATENT DOCUMENTS

| CN | 1290439 A | 4/2001 |
| CN | 1341298 A | 3/2002 |

(Continued)

OTHER PUBLICATIONS

International Search Report and Written Opinion dated Apr. 27, 2018 for International Application No. PCT/CN2017/100712, filed on Sep. 6, 2017 (6 pages).

(Continued)

*Primary Examiner* — Saumit Shah
(74) *Attorney, Agent, or Firm* — Perkins Coie LLP

(57) ABSTRACT

Methods, systems, and devices are disclosed for digital wireless communication, and more specifically, for the use of pilot sequences that improves performance of channel estimation. In one exemplary aspect, a method of wireless communication performed by a communication node is disclosed. The method includes determining, using a first index, a mask sequence from a plurality of pre-determined mask sequences, wherein the plurality of pre-determined mask sequences is determined based on permutations of values 1, −1, i, and −i or permutations of values 1+i, or 1−i, or −1+i, or −1−i; determining a Walsh sequence using a second index, wherein the Wash sequence has a same length as the mask sequence; generating a pilot sequence by combining the mask sequence and the Walsh sequence; and performing a wireless transmission using the pilot sequence.

12 Claims, 6 Drawing Sheets

(51) Int. Cl.
  *H04J 11/00*   (2006.01)
  *H04J 13/12*   (2011.01)

(56)  References Cited

U.S. PATENT DOCUMENTS

| | | | |
|---|---|---|---|
| 2006/0028976 A1* | 2/2006 | Park | H04L 5/0048 370/203 |
| 2008/0285534 A1* | 11/2008 | Dent | H04J 13/18 370/342 |
| 2014/0269847 A1* | 9/2014 | Chiu | H04B 1/71055 375/148 |
| 2017/0093530 A1* | 3/2017 | Kudekar | H04L 25/03866 |
| 2020/0187265 A1* | 6/2020 | Luo | H04L 27/2602 |

FOREIGN PATENT DOCUMENTS

| | | | |
|---|---|---|---|
| CN | 101449481 A | 6/2009 |
| EP | 1109326 A1 | 6/2001 |
| EP | 1475911 A1 | 11/2004 |
| KR | 10-2005-0018296 A | 2/2005 |
| WO | 2001/020797 A1 | 3/2001 |

OTHER PUBLICATIONS

Texas Instruments, "Further results on channel estimation for TDD using pilot symbols," 3GPP, TSG-RAN Working Group 1, TSGR1#6(99)782, 17 pages, Jul. 1999.

Office Action for Chinese Patent Application No. 201780094665.5, dated Nov. 3, 2020.

Notice of Grant for Chinese Patent Application No. 201780094665.5, dated Oct. 13, 2021 (4 pages).

* cited by examiner

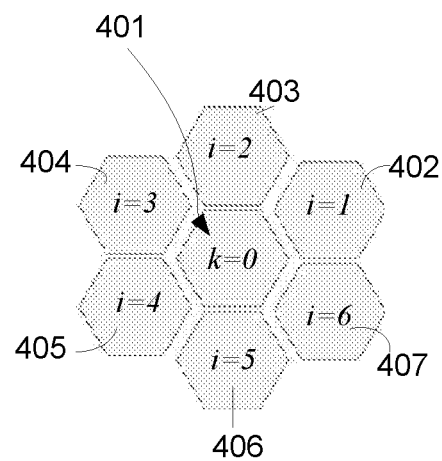
FIG. 4
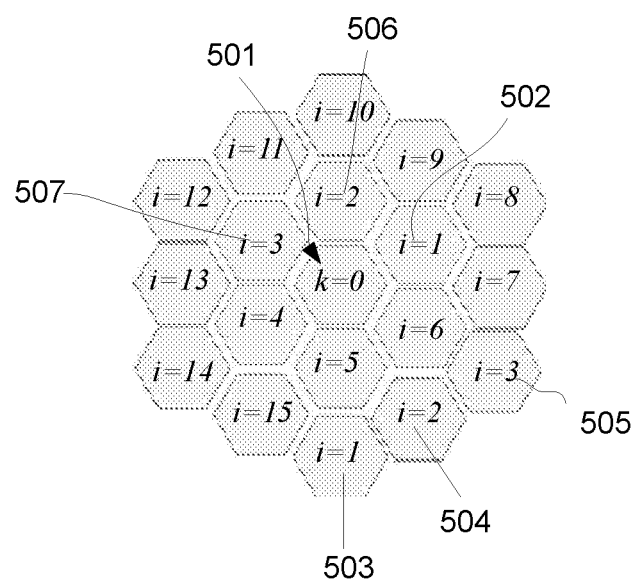

METHOD AND DEVICE FOR PILOT SEQUENCE TRANSMISSION

CROSS REFERENCE TO RELATED APPLICATIONS

This patent document is a U.S. national stage under 35 U.S.C. § 371 of International Patent Application No. PCT/CN2017/100712, filed on Sep. 6, 2017. The entire content of the before-mentioned patent application is incorporated by reference as part of the disclosure of this application.

TECHNICAL FIELD

This document is directed generally to digital wireless communications.

BACKGROUND

Mobile communication technologies are moving the world toward an increasingly connected and networked society. The rapid growth of mobile communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much deeper coverage and huge number of connections.

Summary of Particular Embodiments

This document relates to methods, systems, and devices related to digital wireless communication, and more specifically, for the use of pilot sequences that improves performance of channel estimation, e.g., by User Entities (UEs) that share time-frequency resources.

In one exemplary aspect, a method of wireless communication performed by a communication node is disclosed. The method includes determining, using a first index, a mask sequence from a plurality of pre-determined mask sequences, wherein the plurality of pre-determined mask sequences is determined based on permutations of values 1, −1, i, and −i or permutations of values 1+i, or 1−i, or −1+i, or −1−i; determining a Walsh sequence using a second index, wherein the Wash sequence has a same length as the mask sequence; generating a pilot sequence by combining the mask sequence and the Walsh sequence; and performing a wireless transmission using the pilot sequence.

In some embodiments, the first index and the second index are transmitted to the communication node in a control message. In some embodiments, the first index and the second index are determined based on an identity of the communication code. In some implementations, the identity includes a cell identity or a user equipment identity of the communication code. In some implementations, the first index and the second index are determined based on data in the wireless transmission.

In another exemplary aspect, a method of wireless communication performed by a communication node is disclosed. The method includes storing a plurality of pilot sequences wherein the plurality of pre-determined mask sequences is determined based on permutations of values 1, −1, i, and −i or permutations of values 1+i, or 1−i, or −1+i, or −1−i; selecting, using an index value, a pilot sequence from the plurality of pilot sequences; and performing a wireless transmission using the pilot sequence.

In some embodiments, the index is transmitted to the communication node in a control message. In some embodiments, the index is determined based on an identity of the communication code. In some implementations, the identity includes a cell identity or a user equipment identity of the communication code. In some implementations, the index is determined based on data in the wireless transmission.

In another exemplary aspect, a method of wireless communication is disclosed. The method includes transmitting a message to a communication node, wherein the message indicates one or more index values to allow the communication node to obtain, using the one or more index values, a pilot sequence based on a plurality of pre-determined mask sequences and a plurality of Walsh sequences. In some embodiments, the plurality of pre-determined mask sequences is determined based on permutations of values 1, −1, i, and −i or permutations of values 1+i, or 1−i, or −1+i, or −1−i.

In another exemplary aspect, a method of wireless communication is disclosed. The method includes receiving a message at a communication node, wherein the message indicates one or more index values to allow the communication node to obtain, using the one or more index values, a pilot sequence based on a plurality of pre-determined mask sequences and a plurality of Walsh sequences. In some embodiments, the plurality of pre-determined mask sequences is determined based on permutations of values 1, −1, i, and −i or permutations of values 1+i, or 1−i, or −1+i, or −1−i.

In another exemplary aspect, a method of wireless communication is disclosed. The method includes determining one or more index values to allow a communication node to obtain, using the one or more index values, a pilot sequence based on a plurality of pre-determined mask sequences and a plurality of Walsh sequences to perform a wireless transmission using the pilot sequence.

In some embodiments, the determining of the one or more index values is based on an identity of the communication node. In some implementations, the identity includes a cell identity or a user equipment identity of the communication code. In some embodiments, the determining of the one or more index values is based on data in the wireless transmission. In some embodiments, the plurality of pre-determined mask sequences is determined based on permutations of values 1, −1, i, and −i or permutations of values 1+i, or 1−i, or −1+i, or −1−i.

In another exemplary aspect, an apparatus for wireless communication that is configured or operable to perform the above-described methods is disclosed.

In yet another exemplary aspect, the above-described methods are embodied in the form of processor-executable code and stored in a computer-readable program medium.

The above and other aspects and their implementations are described in greater detail in the drawings, the descriptions, and the claims.

BRIEF DESCRIPTION OF THE DRAWINGS

FIG. 4 shows an exemplary diagram of multiple cells in a wireless communication network.

FIG. 5 shows another exemplary diagram of multiple cells in a wireless communication network.

DETAILED DESCRIPTION

The technology and examples of implementations in this document can be used to improve performance in multiuser wireless communication systems. The term "exemplary" is used to mean "an example of" and, unless otherwise stated, does not imply an ideal or a preferred embodiment. Section headers are used in the present document to facilitate understanding and do not limit the disclosed technology in the sections only to the corresponding section.

In wireless communication systems, such as Long Term Evolution (LTE) systems, to enable data demodulation at a User Entity (UE) or Base Station (BS), reference signals are inserted in the Orthogonal Frequency-Division Multiplexing (OFDM) time-frequency grid to allow for effective channel estimation. Examples of UEs include smart phones, wearable devices, intelligent electric meters, and so on. Resource configuration for reference signals includes allocating time-frequency resource and allocating a pilot sequence. For example, a Demodulation Reference Signal (DMRS) used in LTE Physical Uplink Shared Channel (PUSCH) may occupy 1 Discrete Fourier Transform spread ODFM (DFT-S-ODFM) symbols in one slot. A corresponding 12-length pilot sequence thus is configured as DMRS sequence.

In some wireless systems, in order to suppress and/or eliminate interference between different UEs, the reference signals can occupy different time-frequency or code resources such that resources used by different UEs are orthogonal to each other. However, orthogonal resources are limited. With an increasing number of UEs in wireless communication networks, it is difficult to ensure that the reference signals are orthogonal in either time domain, frequency domain, or code domain.

In order to support a greater number of UEs, code sequences such as Pseudo-Noise (PN) code sequences and/or a combination of PN code sequences and Walsh sequences, may be used. As a result, more pilot sequences that are substantially orthogonal in the code domain may be available to facilitate channel estimation. However, when the pilot sequences are short (e.g., a PN sequence having 16 or less elements), the cross-correlation between the PN code sequences may not be able to demonstrate good performance.

The techniques disclosed in the present document can be used to implement methods and apparatus for generation and use of pilot sequences that demonstrate improvement in interference suppression between different UE as compared to the use of PN code sequences, or a combination of PN code sequences and Walsh sequences.

Overview
Pilot Sequences and Channel Estimation

In wireless communications, Channel estimation is a beneficial step to achieve reliable communication. A simplified illustration of channel estimation and channel equalization is provided as follows. For a point-to-point transmission, the transmitted signal can be described as:

$$y = Hx + n \qquad \text{Eq. (1)}$$

Figure 1:
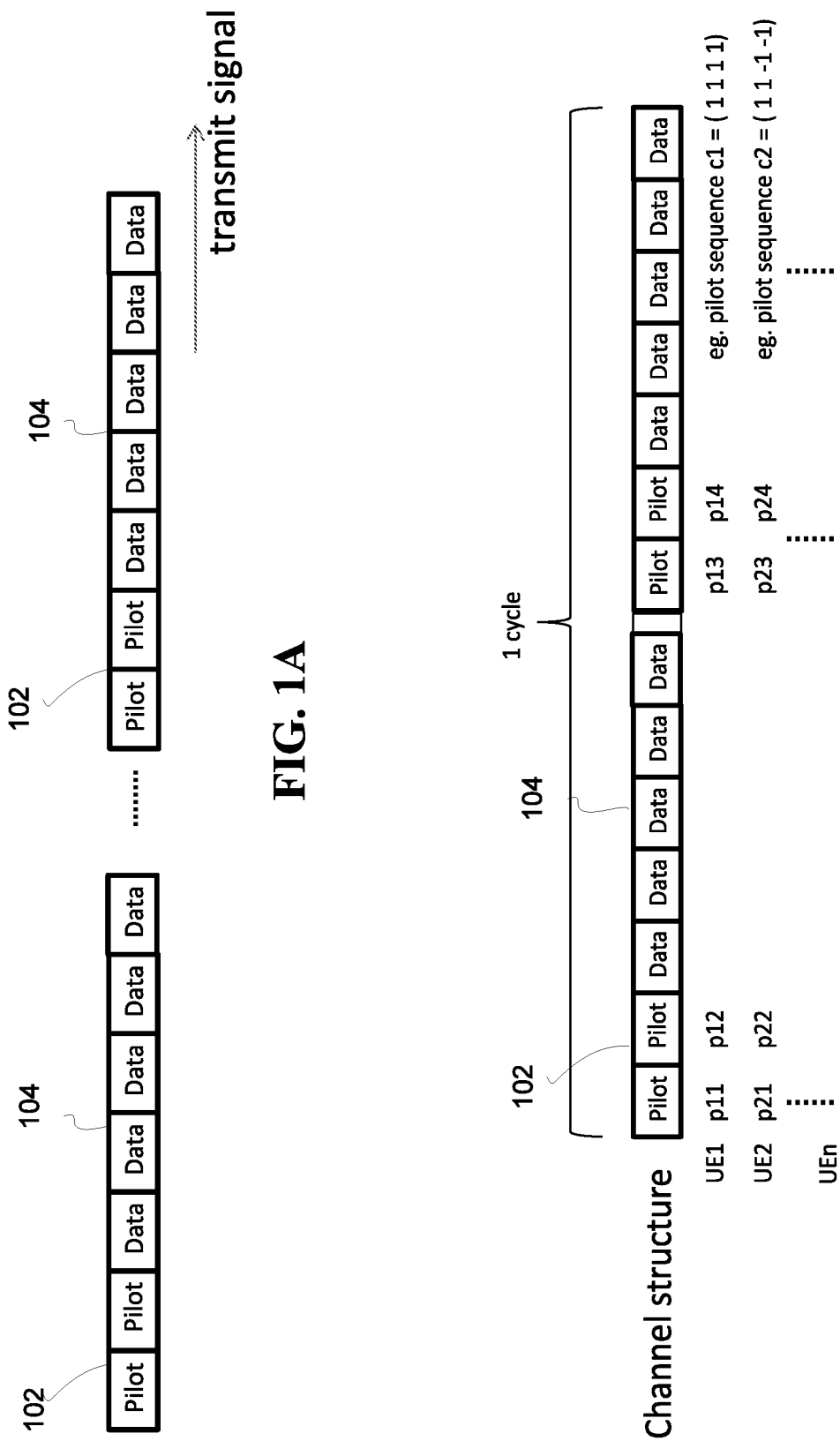
FIG. 1A shows an exemplary diagram of a channel structure including pilot symbols and data symbols.
FIG. 1B shows an exemplary diagram of multiple UEs using the same time-frequency resources to transmit pilot sequences and data.

Here, H denotes the channel matrix, while x denotes the pilot sequence or data being transmitted over the channel. FIG. 1A shows an exemplary diagram of the channel structure including pilot symbols 102 and data symbols 104. The noise is denoted as n, and the received signal is denoted as y.

The receiver receives y(p) for pilot sequence and y(data) for actual data. Because the pilot sequences are known, the receiver estimates the channel matrix H by:

$$H(p) = y(p)/\text{pilot} \qquad \text{Eq. (2)}$$

In some embodiments, the channel matrix for data H(data) can be estimated based on H(p) (e.g., by interpolation). The receiver then can obtain the transmitted data by:

$$\text{Data} = y(\text{data})/H(\text{data}) \qquad \text{Eq. (3)}$$

Pilot Sequences for Multiple UEs

When multiple UEs transmit signals at the same time, they may share the same resources in the time-frequency domain. FIG. 1B shows an exemplary diagram of multiple UEs using the same time-frequency resources to transmit pilot sequences and data. To allow successful channel estimation, it is desirable to use pilot sequences that are orthogonal in the code domain. For example, c1 used by UE1 and c2 used by UE2 shown in FIG. 1B are obtained from a Walsh matrix of dimension 4:

$$Walsh(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

However, only a limited number of sequences are available from a particular Walsh matrix. For example, in the example shown in FIG. 1B, only four orthogonal pilot sequences are available. In order to increase the number of available sequences, the dimension of the Walsh matrix needs to increase as well, leading to pilot sequences occupying more resources in time-frequency domain.

Alternatively, the pilot sequences can be obtained using other types of code sequences, such as PN code sequences. In some implementations, a combination of PN code sequences and Walsh sequences is used to obtain the pilot sequence. Such methods allow generation of a greater number of pilot sequences. However, cross-correlation statistics of PN code sequences are not optimal, particularly for relatively short sequences (e.g., sequences having 16 or fewer elements), thereby impacting the performance of channel estimation.

This document describes, among other techniques, a method for generating pilot sequences. Compared to the Walsh sequence method, this method allows generation of a greater number of orthogonal or substantially orthogonal pilot sequences. The generated pilot sequences also demonstrate better cross-correlation statistics as compared to methods that use PN code sequences.

Specifically, the method includes designing M groups of code sequences, where M is an integer. Each group includes W sequences, where W is an integer. In some embodiments, a set of M mask code sequences is obtained by the following steps: (1) obtain a set of total $4^W$ sequences by permuting values 1, −1, i, and −i, each of the $4^W$ sequences having W entries; (2) examining all possible subsets of the $4^W$ sequences, each subset having M sequences, and (3) solving an optimization problem to identify a subset that results in minimal cross-correlation statistics among all possible subsets.

For example, in the case of M=2 and W=4, one subset A of sequences is: {1, i, 1, −i} and {1, −i, −1, −i}. The cross-correlation value, in some embodiments, can be computed by calculating the dot product of the two sequences. The dot product for subset A, therefore, is $[1, i, 1, -i] \cdot [1, -i, -1, -i]^T = 0$. Another possible subset B of sequences is: {1, i, 1, −i} and {1, −i, 1, i}. The dot product for subset B is $[1, i, 1, -i] \cdot [1, -i, 1, i]^T = 4$. Therefore, subset A is identified as the subset that results in smaller cross-correlation value. For a larger M value, the number of sequences in each subset is bigger, and a large set of cross-correlation values are generated by calculating the dot product of each two sequences in a subset. After obtaining the set of cross-correlation values, the corresponding cross-correlation statistics (e.g., expectation, variance, etc.) of each subset can be computed. Then, the subset that results in minimal cross-correlation statistics among all possible subsets is identified as a set of mask code sequences.

The method then selects, using a first index, a mask code sequence from the set of mask code sequences, selects, using a second index, a corresponding Walsh sequence, and combines the mask code sequence with the corresponding Walsh sequence to obtain the pilot sequence. For example, the two sequences can be combined by performing element-wise multiplication of the two sequences:

$$C(\text{index}_m, \text{index}_w) = \text{Mask}(\text{index}_m) \cdot \text{Walsh}(\text{index}_w) \quad \text{Eq. (4)}$$

Alternatively, the two sequences can also be combined using a phase rotation function:

$$C(\text{index}_m, \text{index}_w) = F_{phase\ rotation}(\text{Mask}(\text{index}_m), \text{Walsh}(\text{index}_w)) \quad \text{Eq. (5)}$$

In some implementations, the resulting pilot sequences can also be normalized by a non-zero value. For example, the normalization may be used such that the pilot sequences each has a same energy.

In some embodiments, instead of keeping $\text{Mask}_{M \times W}$ and Walsh(W) separate, a total number of M×W sequences can be pre-determined. UEs in different cells can use a single index value to obtain the corresponding pilot sequence.

Using the disclosed techniques, UEs in different neighboring cells can select pilot sequences from the M groups of code sequence using one or more index values. For example, UEs in the $i^{th}$ cell can use $\text{index}_m = i$ to obtain a mask code sequence, and UEs in the $j^{th}$ cell can use $\text{index}_m = j$ to obtain another mask code sequence (i≠j). UEs in the $i^{th}$ and $j^{th}$ cell then use different $\text{index}_w$ respectively to select orthogonal Walsh sequences and compute the corresponding pilot sequences. UEs can obtain the indices $\text{index}_m$ and $\text{index}_w$ from a base station via a control message (e.g., a DCI, or downlink control information message in LTE). In some implementations, UEs may also determine the indices based on information such as Cell_ID, UE_ID, or the data bits to be transmitted. For example, $\text{index}_m = \text{Cell\_ID mod M}$, $\text{index}_w = \text{UE\_ID mod W}$. In some embodiments, the first $\log_2(M*W)$ bits of original data bits can be used to indicate the indices.

Alternatively, each UE can use a single index value instead of two indices to obtain orthogonal or substantially orthogonal pilot sequences from a pre-computed set of code sequences. UEs can obtain the index from a base station via a control message (e.g., a DCI message). In some implementations, UEs may also determine the indices based on information such as Cell_ID, UE_ID, or the data bits to be transmitted. For example, $\text{index}_m = \text{Cell\_ID mod M}$, $\text{index}_w = \text{UE\_ID mod W}$. In some embodiments, the first $\log_2(\text{num})$ bits of original data bits can be used to indicate the indices. Here, num represents the number of pilot sequences.

Because the set of mask code sequences is obtained by identifying a subset of permutations of {1, −1, i, −i} in the M×W space (e.g., a 8×8 space) that results in minimized cross-correlation statistics among all permutations, the disclosed method can demonstrate better performance in interference suppression as compared to PN code sequences, particularly when the number of groups is relatively small. It is also noted that the pilot sequence of this scheme may be applied to both the uplink and the downlink communications.

Figure 2:
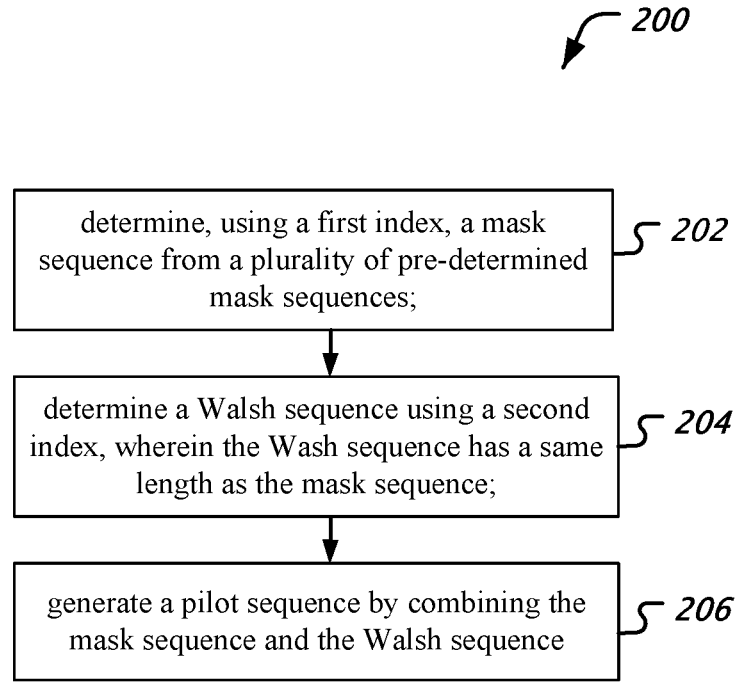
FIG. 2 is a flowchart representation of a method of wireless communication.

FIG. 2 is a flowchart representation of a method of wireless communication 200. The method 200 includes performing a pilot signal transmission, wherein the pilot signal uses a pilot sequence that is generated by, at 202, determining, using a first index, a mask sequence from a plurality of pre-determined mask sequences, wherein the plurality of pre-determined mask sequences is determined based on permutations of values 1, −1, i, and −i or permutations of values 1+i, or 1−i, or −1+i, or −1−i; at 204, determining a Walsh sequence using a second index, wherein the Wash sequence has a same length as the mask sequence; and, at 206, generating a pilot sequence by combining the mask sequence and the Walsh sequence.

Figure 3:
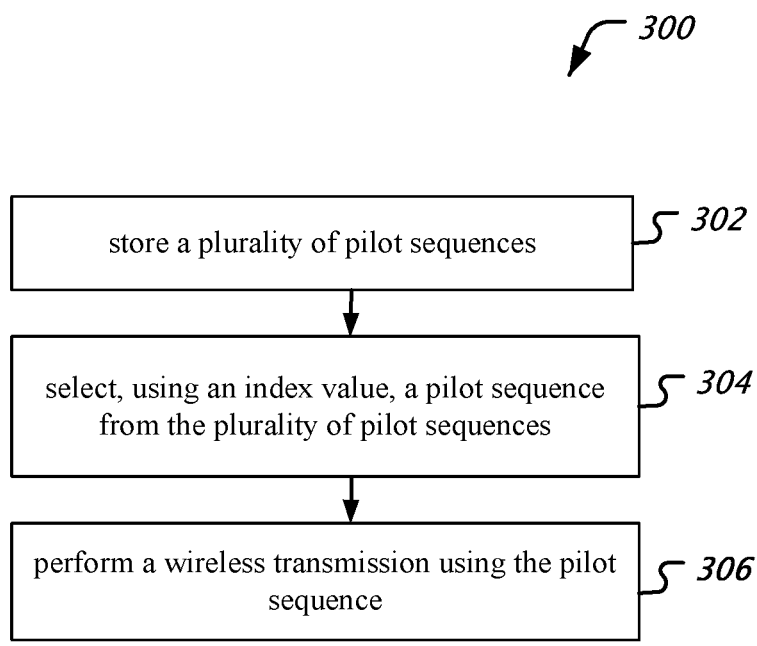
FIG. 3 is a flowchart representation of another method of wireless communication.

FIG. 3 is a flowchart representation of a method of wireless communication 300. The method 300 includes, at 302, storing a plurality of pilot sequences. The method 300 includes, at 304, selecting, using an index value, a pilot sequence from the plurality of pilot sequences. The method 300 includes, at 306, performing a wireless transmission using the pilot sequence.

In some embodiments, A transmission stream for one UE contains pilot sequence 1, pilot sequence 2, . . . in multiple time cycles. Each pilot sequence can be obtained via above mentioned methods.

The above mentioned methods and additional techniques are further explained in the following embodiments.

Exemplary Embodiment 1

In some embodiments, a target cell can detect signal power from a small number of neighboring cells (e.g., 1 to 3 adjacent cells). In those cases, a set of 4×4 code sequences can be used to obtain pilot sequences for the target cell as well as the neighboring cells. The set includes M=4 groups of code sequences, and each group includes W=4 sequences.

In order to obtain the set of 4×4 code sequences, a set of 4×4 mask sequences is first pre-computed by the following steps: (1) obtain a set of total $4^{W=4}$ sequences by permuting values 1, −1, i, and −i, each of the $4^{W=4}$ sequences having W=4 values; (2) examining all possible subsets of the $4^{W=4}$ sequences, each subset having M=4 sequences, and (3) solving an optimization problem to identify a subset that results in minimal cross-correlation statistics among all possible subsets. In this example, the 4×4 mask sequences are:

$$Mask_{4\times 4} = \begin{Bmatrix} 1 & 1 & 1 & 1 \\ 1 & -i & i & 1 \\ 1 & -1 & -i & -1 \\ 1 & i & -1 & i \end{Bmatrix}$$

In some embodiments, the 4×4 mask sequences can also be normalized by multiplying a non-zero value, such as $$\frac{1}{\sqrt{4}}.$$

Other equivalent variances are not excluded, such as multiplying a non-zero value $e^{j\theta}$.

The corresponding 4×4 Walsh matrix is:

$$Walsh(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

UEs in each cell can use a first index, $index_m$, to select a mask sequence in the corresponding group. For example, UEs in target cell can use $index_m=0$ to obtain a mask sequence, and UEs in the adjacent cells can use $index_m=1$, 2, or 3 to obtain different mask sequences. UEs can obtain $index_m$ from a base station via a control message (e.g., a DCI message). UEs can also determine $index_m$ based on information such as Cell_ID, UE_ID, or the data bits to be transmitted.

The UEs in each cell may then use different values for $index_w$ to obtain a corresponding Walsh sequence. For example, $index_w$ can be obtained from a base station via a control message (e.g., a DCI message). In some embodiments, $index_w$ is determined based on random number generation performed by each UE. UEs may also compute $index_w$ based on respective UE_IDs. In this particular example, it is assumed that each cell has fewer than four UEs that have the same time-frequency allocation of reference signals. Therefore, each UE can select a distinct Walsh sequence from Walsh(4×4) to ensure orthogonality within the group/cell. Table 1 shows exemplary index pairs that UEs can use for a set of 4×4 code sequences.

TABLE 1

Index pairs for a set of 4 × 4 code sequences

| | ($index_m$, $index_w$) | | | |
|---|---|---|---|---|
| | $index_w$ = 0 | 1 | 2 | 3 |
| $Index_m$ = 0 | (0, 0) | (0, 1) | (0, 2) | (0, 3) |
| 1 | (1, 0) | (1, 1) | (1, 2) | (1, 3) |
| 2 | (2, 0) | (2, 1) | (2, 2) | (2, 3) |
| 3 | (3, 0) | (3, 1) | (3, 2) | (3, 3) |

Each UE then combines the two sequences to obtain a pilot sequence. The pilot sequence can be combined using Eq. (4), in which each UE performs element-wise multiplication of the two sequences to obtain the final pilot sequence. For example, assuming that $index_m=1$ and $index_w=0$, pilot sequence C(1, 0) can be obtained by computing element-wise multiplication of the two selected vectors:

$$C(1, 0) = Mask(1) \cdot Walsh(0)$$
$$= [1, -i, i, 1] \cdot^* [1, 1, 1, 1]$$
$$= [1, -i, i, 1]$$

In some embodiments, the pilot sequence can be combined by computing phase rotation of the two sequences, such as indicated in Eq. (5). In some embodiments, the resulting C($index_m$, $index_w$) can be further normalized by a non-zero factor.

In Example embodiment 1, each of the mask code sequence in the set has a length of L=M=4. However, it is also possible to pre-compute a set of M mask code sequences, each having a length L≠M. For example, in some embodiments, a set of M=16 mask code sequences can be precomputed, each having a length of L=4. In Example embodiment 1, a Walsh sequence can be selected from a corresponding W×W Walsh matrix (i.e., L=W, leading to 4×4 in this example) to allow element-wise multiplication of the selected vectors. In these cases, the method provides a larger number of available pilot sequences (e.g., 16) than the Walsh method (e.g., 4).

Exemplary Embodiment 2

Four groups of code sequences, each group having four code sequences, can be pre-computed directly based on $Mask_{4\times 4}$ and Walsh(4) shown in the embodiment 1. The 4×4 code sequences obtained based on $Mask_{4\times 4}$ and Walsh(4) are:

$$\begin{Bmatrix} 1 & 1 & 1 & 1 \\ 1 & -1 & 1 & -1 \\ 1 & 1 & -1 & -1 \\ 1 & -1 & -1 & 1 \\ 1 & -i & i & 1 \\ 1 & i & i & -1 \\ 1 & -i & -i & -1 \\ 1 & i & -i & 1 \\ 1 & -1 & -i & -i \\ 1 & 1 & -i & i \\ 1 & -1 & i & i \\ 1 & 1 & i & -i \\ 1 & i & -1 & i \\ 1 & -i & -1 & -i \\ 1 & i & 1 & -i \\ 1 & -i & 1 & i \end{Bmatrix}$$

In some embodiments, the resulting pilot sequences can also be normalized by multiplying a non-zero value, such as $$\frac{1}{\sqrt{4}}.$$

Other equivalent variances are not excluded, such as multiplying a non-zero value $e^{j\theta}$.

UEs in different cells can use an index value to obtain the corresponding pilot sequence. For example, the base station can inform UEs which index to use in a control message (e.g., a DCI message). In some implementations, UEs can determine the index value based on information such as Cell_ID, UE_ID, or the data bits to be transmitted. Table 2 shows corresponding pilot sequences selections based on index values.

TABLE 2

Pilot sequences selections based on index values

| | C(index) |
|---|---|
| index = 0 | 1 1 1 1 |
| 1 | 1 −1 1 −1 |
| 2 | 1 1 −1 −1 |
| ... | ... |
| 15 | 1 −i 1 i |

Exemplary Embodiment 3

FIG. 4 shows an exemplary diagram of multiple neighboring cells in a wireless communication network. The target cell 401 has six adjacent cells 402-407. The target base station in cell 401 can receive signal power from these adjacent cells 402-407. The signal power from other cells that are further away from the target cell 401 (not shown) can be deemed as negligible.

Because the number of adjacent cells is small (e.g., six), a set of 8×8 code sequences can be used to obtain pilot sequences for the target cell as well as the neighboring cells. The set includes M=8 groups of code sequences, and each group includes W=8 sequences.

In order to obtain the set of 8×8 code sequences, a set of 8×8 mask sequences is first pre-computed by the following steps: (1) obtain a set of total $4^{W=8}$ sequences by permuting values 1, −1, i, and −i, each of the $4^{W=8}$ sequences having W=8 values; (2) examining all possible subsets of the $4^{W=8}$ sequences, each subset having M=8 sequences, and (3) solving an optimization problem to identify a subset that results in minimal cross-correlation statistics among all possible subsets. In this particular example, the 8×8 mask sequences are:

$$Mask_{8\times 8} = \begin{Bmatrix} 1 & 1 & 1 & 1 & 1 & 1 & 1 & 1 \\ 1 & -i & 1 & -i & i & 1 & -i & -1 \\ 1 & -1 & -i & i & i & i & -1 & -1 \\ 1 & i & -i & 1 & 1 & -i & -i & -1 \\ 1 & 1 & i & -i & 1 & i & i & i \\ 1 & -i & i & -1 & 1 & 1 & 1 & -i \\ 1 & -1 & -1 & -1 & i & i & i & i \\ 1 & i & -1 & i & -i & -1 & -1 & i \end{Bmatrix}$$

In some embodiments, the 8×8 mask sequences can also be normalized by multiplying a non-zero value, such as $$\frac{1}{\sqrt{8}}.$$

Other equivalent variances are not excluded, such as multiplying a non-zero value $e^{j\theta}$.

The Walsh matrix can be obtained by computing the Hadamard matrices recursively. For example, a sequence-ordered 8×8 Walsh matrix is:

$$Walsh(8) = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

UEs in each cell can select a first index, $index_m$, to select a mask sequence in the corresponding group. UEs can determine $index_m$ based on information such as Cell_ID and/or UE_ID. For example, UEs in target cell 201 can use $index_m$=Cell_ID mod 7=0 to obtain a mask sequence, and UEs in the adjacent cell 202 can use $index_m$=Cell_ID mod 7=1 to obtain a different mask sequence. UEs can also obtain index, from the base station via control messages. Because there are only seven cells in this specific example, UEs in different cells are guaranteed different mask sequences.

The UEs in each cell then use different values for $index_w$ to obtain a corresponding Walsh sequence. For example, $index_w$ can be obtained from a base station via a control message (e.g., a DCI message). In some embodiments, $index_w$ is determined based on random number generation performed by each UE. UEs may also compute index based on respective UE_IDs. In this particular example, it is assumed that each cell has fewer than eight UEs that have the same time-frequency allocation of reference signals. Therefore, each UE can select a distinct Walsh sequence from Walsh(8×8) to ensure orthogonality within the group/cell. Table 3 shows exemplary index pairs that UEs can use for a set of 8×8 code sequences.

TABLE 3

Index pairs for a set of 8 × 8 code sequences

| | ($index_m$, $index_w$) | | | | | | | |
|---|---|---|---|---|---|---|---|---|
| | $index_w$ = 0 | 1 | 2 | 3 | 4 | 5 | 6 | 7 |
| $index_m$ = 0 | (0, 0) | (0, 1) | (0, 2) | (0, 3) | (0, 4) | (0, 5) | (0, 6) | (0, 7) |
| 1 | (1, 0) | (1, 1) | (1, 2) | (1, 3) | (1, 4) | (1, 5) | (1, 6) | (1, 7) |
| 2 | (2, 0) | (2, 1) | (2, 2) | (2, 3) | (2, 4) | (2, 5) | (2, 6) | (2, 7) |
| 3 | (3, 0) | (3, 1) | (3, 2) | (3, 3) | (3, 4) | (3, 5) | (3, 6) | (3, 7) |
| 4 | (4, 0) | (4, 1) | (4, 2) | (4, 3) | (4, 4) | (4, 5) | (4, 6) | (4, 7) |
| 5 | (5, 0) | (5, 1) | (5, 2) | (5, 3) | (5, 4) | (5, 5) | (5, 6) | (5, 7) |
| 6 | (6, 0) | (6, 1) | (6, 2) | (6, 3) | (6, 4) | (6, 5) | (6, 6) | (6, 7) |
| 7 | (7, 0) | (7, 1) | (7, 2) | (7, 3) | (7, 4) | (7, 5) | (7, 6) | (7, 7) |

Each UE then combines the two sequences to obtain a pilot sequence. The pilot sequence can be combined using Eq. (4), in which each UE performs element-wise multiplication of the two sequences to obtain the final pilot sequence. For example, assuming that $index_m=1$ and $index_w=0$, pilot sequence $C(1, 0)$ can be obtained by computing element-wise multiplication of the two selected vectors:

$$C(1, 0) = Mask(1) \cdot Walsh(0)$$
$$= [1, -i, 1, -i, i, -i, -1] \cdot {}^* [1, 1, 1, 1, 1, 1, 1, 1]$$
$$= [1, -i, 1, -i, i, 1, -i, -1]$$

In some embodiments, the pilot sequence can be combined by computing phase rotation of the two sequences, as indicated in Eq. (5). In some embodiments, the resulting $C(index_m, index_w)$ can be further normalized by a non-zero factor.

In this example, each of the mask code sequence in the set has a length of $L=M=8$. However, it is also possible to precompute a set of M mask code sequences, each having a length $L \neq M$. For example, in some embodiments, a set of $M=16$ mask code sequences can be precomputed, each having a length of $L=8$. In this example, A Walsh sequence can be selected from a corresponding W×W Walsh matrix (i.e., L=W, leading to 8×8 in this example) to allow element-wise multiplication of the selected vectors. In these embodiments, the method provides a larger number of available pilot sequences (e.g., 16) than the Walsh method (e.g., 8).

Exemplary Embodiment 4

Eight groups of code sequences, each group having eight code sequences, can be pre-computed directly based on $Mask_{8\times 8}$ and $Walsh(8)$ shown in the embodiment 3. The 8×8 code sequences obtained based on $Mask_{8\times 8}$ and $Walsh(8)$ are:

{1  1   1   1   1   1   1   1
1  -1   1  -1   1  -1   1  -1
1   1  -1  -1   1   1  -1  -1
1  -1  -1   1   1  -1  -1   1
1   1   1   1  -1  -1  -1  -1
1  -1   1  -1  -1   1  -1   1
1   1  -1  -1  -1  -1   1   1
1  -1  -1   1  -1   1   1  -1
1  -i   1  -i   i   1  -i   1
1   i   1   i   i  -1  -i   1
1  -i  -1   i   i   1   i   1
1   i  -1  -i   i  -1   i  -1
1  -i   1  -i  -i  -1   i   1
1   i   1   i  -i   1   i  -1

-continued

1  -i  -1   i  -i  -1  -i  -1
1   i  -1  -i  -i   1  -i   1
1  -1  -i   i   i   i  -1  -1
1   1  -i  -i   i  -i  -1   1
1  -1   i  -i   i   i   1   1
1   1   i   i   i  -i   1  -1
1  -1  -i   i  -i  -i   1   1
1   1  -i  -i  -i   i   1  -1
1  -1   i  -i  -i  -i  -1  -1
1   1   i   i  -i   i  -1   1
1   i  -i   1   1  -i  -i  -i
1  -i  -i  -1   1   i  -i   1
1   i   i  -1   1  -i   i   1
1  -i   i   1   1   i   i  -1
1   i  -i   1  -1   i   i   1
1  -i  -i  -1  -1  -i   i  -1
1   i   i  -1  -1   i  -i  -1
1  -i   i   1  -1  -i  -i   1
1   1   i  -i  -1   1   i   i
1  -1   i   i  -1  -1   i  -i
1   1  -i   i  -1   1  -i  -i
1  -1  -i  -i  -1  -1  -i   i
1   1   i  -i   1  -1  -i  -i
1  -1   i   i   1   1  -i   i
1   1  -i   i   1  -1   i   i
1  -1  -i  -i   1   1   i  -i
1  -i  -i   1   1   i  -i
1  -i   i  -1  -i   1   1  -i
1   i   i   1  -i  -1   1   i
1  -i  -i   1  -i   1  -1   i
1   i   i   1  -i  -1  -1  -i
1  -1  -1  -1  -i   i   i   i
1   1  -1   1  -i  -i   i  -i
1  -1   1   1  -i  -i  -i  -i
1   1   1  -1  -i   i  -i   i
1  -1  -1  -1   i  -i  -i  -i
1   1  -1   1   i   i  -i   i
1   1   1  -1   i  -i   i  -i
1  -1   1   1   i   i   i   i
1   i  -1   i  -1  -i  -1   i
1  -i  -1  -i  -1   i  -1  -i

-continued $$\begin{matrix} 1 & i & 1 & -i & -1 & -i & 1 & -i \\ 1 & -i & 1 & i & -1 & i & 1 & i \\ 1 & i & -1 & i & 1 & i & 1 & -i \\ 1 & -i & -1 & -i & 1 & -i & 1 & i \\ 1 & i & 1 & -i & 1 & i & -1 & i \\ 1 & -i & 1 & i & 1 & -i & -1 & -i \end{matrix}\}$$

In some embodiments, the resulting pilot sequences can also be normalized using a non-zero value, such as $$\frac{1}{\sqrt{8}}.$$

Other equivalent variances are not excluded, such as multiplying a non-zero value $e^{j\Theta}$.

UEs in different cells can use an index value to obtain the corresponding pilot sequence. For example, the base station can inform UEs which index to use in a control message (e.g., a DCI message). In some implementations, UEs can determine the index value based on information such as Cell_ID, UE_ID, or the data bits to be transmitted. Table 4 shows corresponding pilot sequence selection based on the index value.

TABLE 4

Pilot sequences selections based on index values

| | Pilot sequence C(index) |
|---|---|
| Sequence index = 0 | 1 1 1 1 1 1 1 1 |
| 1 | 1 −1 1 −1 1 −1 1 −1 |
| 2 | 1 1 −1 −1 1 1 −1 −1 |
| ... | ... |
| 63 | 1 −i 1 i 1 −i −1 −i |

Exemplary Embodiment 5

When the number of adjacent cells gets bigger, it is desirable to use longer code sequences to obtain pilot sequences. For example, a set of 16×16 code sequences can be used to obtain the pilot sequences for the target cell as well as the neighboring cells. The set includes M=16 groups of code sequences, and each group includes W=16 sequences.

In order to obtain the set of 16×16 code sequences, a set of 16×16 mask sequences is first pre-computed by the following steps: (1) obtain a set of total $4^{W=16}$ sequences by permuting values 1, −1, i, and −i, each of the $4^{W=16}$ sequences having W=16 values; (2) examining all possible subsets of the $4^{W=16}$ sequences, each subset having M=16 sequences, and (3) solving an optimization problem to identify a subset that results in minimal cross-correlation statistics among all possible subsets. In this particular example, the 16×16 mask sequences are:

$$Mask_{16\times16} = \begin{Bmatrix} 1 & 1 & 1 & 1 & 1 & 1 & 1 & 1 & 1 & 1 & 1 & 1 & 1 & 1 & 1 & 1, \\ 1 & -i & 1 & -i & -i & -1 & -i & -1 & i & 1 & -i & -1 & -1 & i & 1 & -i, \\ 1 & -1 & 1 & -1 & i & -i & -i & i & i & i & -i & -i & 1 & 1 & 1 & 1, \\ 1 & i & 1 & i & -1 & -i & 1 & i & 1 & -i & 1 & -i & -1 & i & 1 & -i, \\ 1 & 1 & -i & -i & i & -i & -1 & 1 & -1 & 1 & -i & i & i & i & 1 & 1, \\ 1 & -i & -i & -1 & -1 & -i & -i & 1 & -i & 1 & -1 & -i & i & 1 & -1 & i, \\ 1 & -1 & -i & i & 1 & 1 & -i & -i & -i & i & -1 & 1 & -i & -i & -1 & -1, \\ 1 & i & -i & 1 & -i & -1 & -1 & i & -1 & -i & -i & 1 & -i & -1 & 1 & -i, \\ 1 & 1 & i & -i & i & -1 & 1 & -i & i & -1 & -1 & 1 & 1 & i & -i, \\ 1 & -i & i & -1 & -1 & -i & i & 1 & -1 & -i & -i & -1 & -1 & i & i & -1, \\ 1 & -1 & i & i & 1 & 1 & i & -i & -1 & 1 & -i & -i & 1 & 1 & i & -i, \\ 1 & i & i & 1 & -i & -1 & 1 & i & -i & 1 & -1 & i & -1 & i & i & -1, \\ 1 & 1 & -1 & 1 & 1 & 1 & -1 & 1 & i & i & -i & i & -i & -i & i & -i, \\ 1 & -i & -1 & -i & -i & -1 & i & -1 & 1 & -i & 1 & i & -i & -1 & -i & 1, \\ 1 & -1 & -1 & -1 & i & -i & i & i & 1 & 1 & 1 & -1 & i & i & -i & i, \\ 1 & i & -1 & i & -1 & -i & -1 & i & i & 1 & -i & 1 & i & 1 & i & -1 \end{Bmatrix}$$

In some embodiments, the 16×16 mask sequences can also be normalized by multiplying a non-zero value, such as $$\frac{1}{\sqrt{16}}.$$

Other equivalent variances are not excluded, such as multiplying a non-zero value $e^{j\Theta}$.

The 16×16 Walsh matrix can be obtained by computing the Hadamard matrices recursively.

UEs in each cell can select a first index, $index_m$, to select a mask sequence in the corresponding group. UEs can determine $index_m$ based on information such as Cell_ID and/or UE_ID. For example, UEs in target cell can use $index_m$=Cell_ID mod 15=0 to obtain a mask sequence, and UEs in an adjacent cell can use $index_m$=Cell_ID mod 15=1 to obtain a different mask sequence. Here, "mod" refers to modulo operation. UEs can also obtain index from the base station via control messages.

The UEs in each cell then use different values for $index_w$ to obtain a corresponding Walsh sequence. For example, $index_w$ can be obtained from a base station via a control message (e.g., a DCI message). In some embodiments, $index_w$ is determined based on random number generation performed by each UE. UEs may also compute $index_m$ based on respective UE_IDs. In this particular example, it is assumed that each UE can select a distinct Walsh sequence from Walsh(16×16) to ensure orthogonality within the group/cell. Table 5 shows exemplary index pairs that UEs can use for a set of 16×16 code sequences.

TABLE 5

Index pairs for a set of 16 × 16 code sequences

| | $(index_m, index_w)$ | | | | | |
|---|---|---|---|---|---|---|
| | $index_w = 0$ | 1 | 2 | 3 | ... | 15 |
| $index_m = 0$ | (0, 0) | (0, 1) | (0, 2) | (0, 3) | ... | (0, 15) |
| 1 | (1, 0) | (1, 1) | (1, 2) | (1, 3) | ... | (1, 15) |
| 2 | (2, 0) | (2, 1) | (2, 2) | (2, 3) | ... | (2, 15) |
| 3 | (3, 0) | (3, 1) | (3, 2) | (3, 3) | ... | (3, 15) |
| ... | ... | ... | ... | ... | ... | ... |
| 15 | (15, 0) | (15, 1) | (15, 2) | (15, 3) | ... | (15, 15) |

Each UE then combines the two sequences to obtain a pilot sequence. The pilot sequence can be combined using Eq. (4), in which each UE performs element-wise multiplication of the two sequences to obtain the final pilot sequence. For example, assuming that $index_m=1$ and $index_w=0$, pilot sequence C(1, 0) can be obtained by computing element-wise multiplication of the two selected vectors:

$$C(1, 0) = \text{Mask}(1) \cdot Walsh(0)$$
$$= [1, -i, 1, -i, -i, -1, -i, -1, i, 1, -i, -1, -1, i, 1, -i] \cdot^*$$
$$[1, 1, 1, 1, 1, 1, 1, 1, 1, 1, 1, 1, 1, 1, 1, 1]$$
$$= [1, -i, 1, -i, -i, -1, -i, -1, i, 1, -i, -1, -1, i, 1, -i]$$

In some embodiments, the pilot sequence can be combined by computing phase rotation of the two sequences, as indicated in Eq. (5). In some embodiments, the resulting $C(index_m, index_w)$ can be further normalized by a non-zero factor.

Exemplary Embodiment 6

In some embodiments, it is desirable to use even longer code sequences to obtain pilot sequences. For example, a set of 32×32 code sequences can be used to obtain the pilot sequences for the target cell as well as the neighboring cells. The set includes M=32 groups of code sequences, and each group includes W=32 sequences.

In order to obtain the set of 32×32 code sequences, a set of 32×32 mask sequences is first pre-computed by the following steps: (1) obtain a set of total $4^{W=32}$ sequences by permuting values 1, −1, i, and −i, each of the $4^{W=32}$ sequences having W=32 values; (2) examining all possible subsets of the $4^{W=32}$ sequences, each subset having M=32 sequences, and (3) solving an optimization problem to identify a subset that results in minimal cross-correlation statistics among all possible subsets. In this particular example, the 32×32 mask sequences are:

$Mask_{32 \times 32} = \{$ 1 1 1 1 1 1 1 1 1 1 1 1 1 1 1 1
1 1 1 1 1 1 1 1 1 1 1 1 1 1 1 1,
1 −i 1 −i 1 −i 1 −i −1 i −1 i 1 −i 1 −i
−i −1 i 1 −i −1 i 1 i 1 −i −1 −i −1 i 1,
1 −1 1 −1 −i i −i i 1 −1 1 −1 i −i i −i
−1 −1 −1 −1 i i i i 1 1 −1 −1 −i −i i i,
1 i 1 i −i 1 −i 1 −1 −i 1 i −1 1 i −1
i 1 −i −1 1 −i −1 i i 1 1 −1 i −1 −1 i,
1 1 1 1 −1 −1 1 1 −i −i −i −i i i −i −i i
−i −i −i −i −i −i i i −1 1 −1 1 1 −1 1 −1,
1 −i 1 −i −1 i −1 i −1 i −1 i −1 i −1 i 1
1 −i −1 i 1 −i 1 −i 1 −i −1 i −1 i −1 i 1,
1 −1 1 −1 i −i −i i −i −i i i 1 1 1 1
i i i i 1 1 −1 −1 −1 1 1 −1 i −i i −i,
1 i 1 i −i 1 i 1 1 −i −1 i 1 −i 1 −i
−1 i 1 −i i 1 1 i −1 1 −1 −i 1 −1 −i 1 i,
1 1 −i 1 −i i 1 1 i −1 i −1 −1 −i 1 i
i i −1 −1 i 1 1 −i −1 −1 i −i 1 1 i −1,
1 −i −i −1 1 i −i 1 1 −i −i −1 1 i −1 1 i
1 −1 −1 −i −i 1 −i −1 −i −1 1 i −i 1 −1 i,
1 1 −i −1 1 −1 −i i 1 −1 −1 −i i 1 −i −i
1 −1 −i −i −1 1 −i 1 1 −1 −1 1 −i i i i,
1 i −1 i 1 i 1 −i −1 1 −i i 1 1 −1 1
−i 1 −i −1 i −1 i 1 i i 1 −i 1 i i −i,
1 1 1 i i i −i 1 −1 −1 i i i i −i −i −i
i −i −i −i −1 1 −1 −1 −i −i −i 1 1 −1 1,
1 −i −1 −i −1 i −1 i 1 i −1 −1 i −1 i
i −1 i 1 −1 −i 1 1 −1 i 1 i i 1 i 1,
−1 −i −1 i −i 1 1 −1 i 1 i i 1 i −1,
1 −1 −1 −1 1 −1 −1 1 1 −1 1 −1 −1 −1 1
−i i i i i −i i −i −i i i i −i i −i,
1 i −1 i −1 −i i −1 i 1 −1 i −1 i −i
1 1 1 −i −i 1 −i −1 1 1 −i −1 1 1 i,
1 1 1 −i −i i 1 1 i −1 −1 1 1 i i
−i i −1 −1 1 1 −i i 1 −1 i −i −1 −1 i −1
1 i i 1 i −1 −i −i 1 1 −i −i 1 1 i
−1 −i −i −1 1 −i −1 −i −i 1 i 1 −1 −i,
1 1 i 1 1 1 i 1 1 i 1 1 i 1 i −i,
1 −1 −i −i i i −1 −1 −i i −1 −1 1 1,
−i i −1 −1 1 −i −i −1 −i i 1 1 −i −i,
1 −1 i 1 −1 1 i −i −1 −i −1 −i 1 i
−1 1 i 1 −i −i 1 −i 1 −i −1 1 −i −i,
1 i i 1 −i i −1 i −1 −1 −1 i 1

$i$ −1 −1 $i$ −$i$ −1 −1 −$i$ −$i$ −1 1 $i$ $i$ −1 1 −$i$}

In some embodiments, the 32×32 mask sequences can also be normalized by multiplying a non-zero value, such as $$\frac{1}{\sqrt{32}}.$$

Other equivalent variances are not excluded, such as multiplying a non-zero valued $e^{j\Theta}$.

The 32×32 Walsh matrix can be obtained by computing the Hadamard matrices recursively.

UEs in each cell can select a first index, $index_m$, to select a mask sequence in the corresponding group. UEs can determine $index_m$ based on information such as Cell_ID and/or UE_ID. For example, UEs in target cell can use $index_m$=Cell_ID mod 31=0 to obtain a mask sequence, and UEs in an adjacent cell can use $index_m$=Cell_ID mod 31=1 to obtain a different mask sequence. Here, "mod" refers to modulo operation. UEs can also obtain $index_m$ from the base station via control messages.

The UEs in each cell then use different values for $index_w$ to obtain a corresponding Walsh sequence. For example, $index_w$ can be obtained from a base station via a control message (e.g., a DCI message). In some embodiments, $index_w$ is determined based on random number generation performed by each UE. UEs may also compute $index_m$ based on respective UE_IDs. In this particular example, it is assumed that each UE can select a distinct Walsh sequence from Walsh(32×32) to ensure orthogonality within the group/cell. Table 6 shows exemplary index pairs that UEs can use for a set of 32×32 code sequences.

TABLE 6

Index pairs for a set of 32 × 32 code sequences

| | ($index_m$, $index_w$) | | | | | |
|---|---|---|---|---|---|---|
| | $index_w$ = 0 | 1 | 2 | 3 | ... | 31 |
| $index_m$ = 0 | (0, 0) | (0, 1) | (0, 2) | (0, 3) | ... | (0, 31) |
| 1 | (1, 0) | (1, 1) | (1, 2) | (1, 3) | ... | (1, 31) |
| 2 | (2, 0) | (2, 1) | (2, 2) | (2, 3) | ... | (2, 31) |
| 3 | (3, 0) | (3, 1) | (3, 2) | (3, 3) | ... | (3, 31) |
| ... | ... | ... | ... | ... | ... | ... |
| 31 | (31, 0) | (31, 1) | (31, 2) | (31, 3) | ... | (31, 31) |

Each UE then combines the two sequences to obtain a pilot sequence. The pilot sequence can be combined using Eq. (4), in which each UE performs element-wise multiplication of the two sequences to obtain the final pilot sequence. For example, assuming that $index_m$=1 and $index_w$=0, pilot sequence C(1, 0) can be obtained by computing element-wise multiplication of the two selected vectors:

$$C(1, 0) = Mask(1) \cdot Walsh(0)$$

$$= [1, -i, 1, -i, 1, -i, 1, -i, -1, i, -1, i, 1, -i, 1, -i, -i, -1, i, 1, -i, -1, i, 1, 1, -i, -1, -i, -1, i, 1] \cdot^*$$

$$[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1]$$

$$= [1, -i, 1, -i, 1, -i, 1, -i, -1, i, -1, i, 1, -i, 1, -i, -i, -1, i, 1, -i, -1, i, 1, 1, -i, -1, -i, -1, i, 1]$$

In some embodiments, the pilot sequence can be combined by computing phase rotation of the two sequences, as indicated in Eq. (5). In some embodiments, the resulting C($index_m$, $index_w$) can be further normalized by a non-zero factor.

Exemplary Embodiment 7

For an orthogonal system, the inter-cell and/or intra-cell interference can be well suppressed due to the orthogonality of the resources in time domain, frequency domain, and/or code domain. However, when the number of UEs in each cell increases, it is inevitable that some UEs in the same cell will share overlapping resources in the time, frequency, and code domains.

For example, a target cell k=0 has six neighboring cells i=1, 2, ... , 6. A set of 8×8 code sequences is available for the target cell and the five neighboring cells. The total number of cells is seven, so each cell can select a distinct mask sequence as described in embodiment 3. However, the target cell has ten UEs that share resources in the time-frequency domain. Because the number if UEs is larger than the number of Walsh sequences available, at least two UEs will have the same Walsh sequence (along with the same mask sequence). The resulting pilot sequence will be the same for the two UEs, causing problems in channel estimation and interference suppression.

In this case, because there are additional sequences available, it is possible to assign code sequences in another group to the two additional UEs in the target cell. For example, UE1 in the target cell uses C(0, 0), UE2 uses C(0, 1), ... , and UE8 uses C(0, 7). Then UE9 in the target cell uses C(7, 0) from another group, and UE10 uses C(7, 1). All ten UEs in the target cell now use orthogonal (or substantially orthogonal) pilot sequences. The pilot sequences used by the UEs in the target cell k=0 are also orthogonal or substantially orthogonal to pilot sequences used by UEs in adjacent cells, leading to better performance in interference suppression.

Exemplary Embodiment 8

When a target cell has many neighboring cells, there may not be enough groups of code sequences available for all cells.

For example, as shown in FIG. 5, a target cell 501 has 18 neighboring cells. Within the target cell 501, there are ten UEs that share resources in the time-frequency domain. A set of 16×16 code sequences, such as the sequences described in embodiment 5, is available to all cells.

The target cell can use $index_m$=0 to select a mask sequence. The neighboring cells may use $index_m$=1, 2, ... , 15 to select respective mask sequences. However, because there are 18 neighboring cells in total, at least two cells 502 and 503 will have the same index$_m$.

In this case, because there are additional sequences available in the 16×16 set, it is possible to assign code sequences in the same group to UEs in different cells. For example, UE1 to UE10 in cell 502 use C(1, 0) to C(1, 9). Then UEs in the neighboring cell 503 can use C(1, 10) to C(1, 15) instead of using the same sequences with cell 502 in the group C(1, x). Similarly, UEs in cell 504 and 505 can use the additional pilot sequences available in the 16×16 set instead of using conflicting code sequences used by cell 506 and 507.

Figure 6:
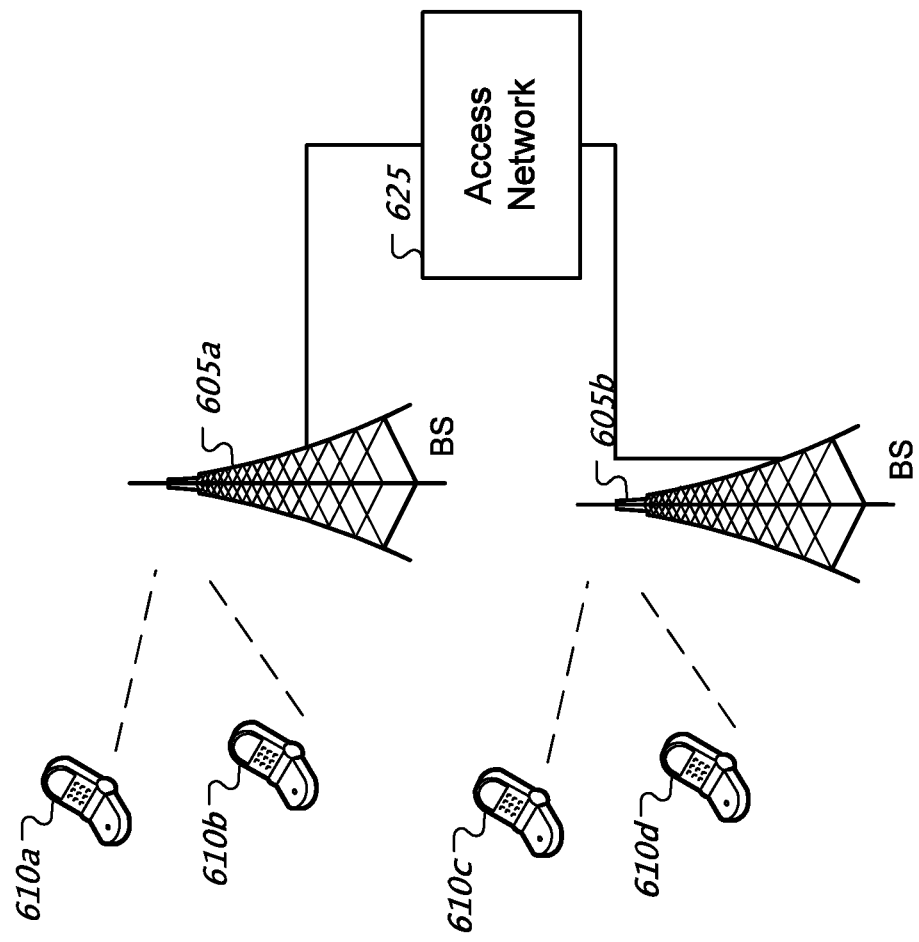
FIG. 6 shows an example of a wireless communication system where techniques in accordance with one or more embodiments of the present technology can be applied.

FIG. 6 shows an example of a wireless communication system where techniques in accordance with one or more embodiments of the present technology can be applied. A wireless communication system 400 can include one or more base stations (BSs) 605a, 605b, one or more wireless devices 610a, 610b, 610c, 610d, and an access network 625. A base station 605a, 605b can provide wireless service to wireless devices 610a, 610b, 610c and 610d in one or more wireless sectors. In some implementations, a base station 605a, 605b includes directional antennas to produce two or more directional beams to provide wireless coverage in different sectors.

The access network 625 can communicate with one or more base stations 605a, 605b. In some implementations, the access network 625 includes one or more base stations 605a, 605b. In some implementations, the access network 625 is in communication with a core network (not shown in FIG. 4) that provides connectivity with other wireless communication systems and wired communication systems. The core network may include one or more service subscription databases to store information related to the subscribed wireless devices 610a, 610b, 610c and 610d. A first base station 605a can provide wireless service based on a first radio access technology, whereas a second base station 605b can provide wireless service based on a second radio access technology. The base stations 605a and 605b may be co-located or may be separately installed in the field according to the deployment scenario. The access network 625 can support multiple different radio access technologies.

In some implementations, a wireless communication system can include multiple networks using different wireless technologies. A dual-mode or multi-mode wireless device includes two or more wireless technologies that could be used to connect to different wireless networks.

Figures 7, 10:
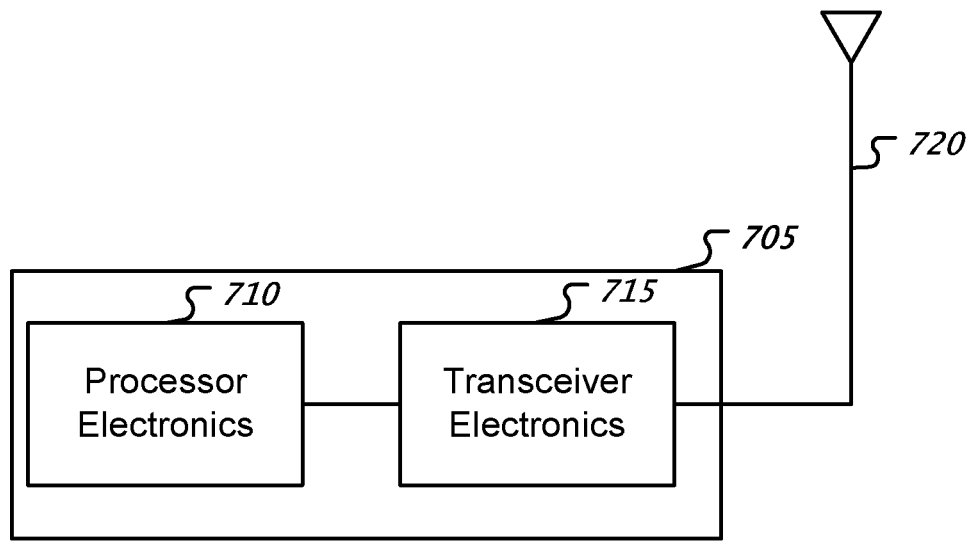
FIG. 7 is a block diagram representation of a portion of a radio station.
FIG. 10 is a flowchart representation of yet another method of wireless communication.

FIG. 7 is a block diagram representation of a portion of a radio station. A radio station 705 such as a base station or a UE can include processor electronics 710 such as a microprocessor that implements one or more of the wireless techniques presented in this document. The radio station 705 can include transceiver electronics 715 to send and/or receive wireless signals over one or more communication interfaces such as antenna 720. The radio station 705 can include other communication interfaces for transmitting and receiving data. Radio station 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the radio station 705.

Figures 8, 9:
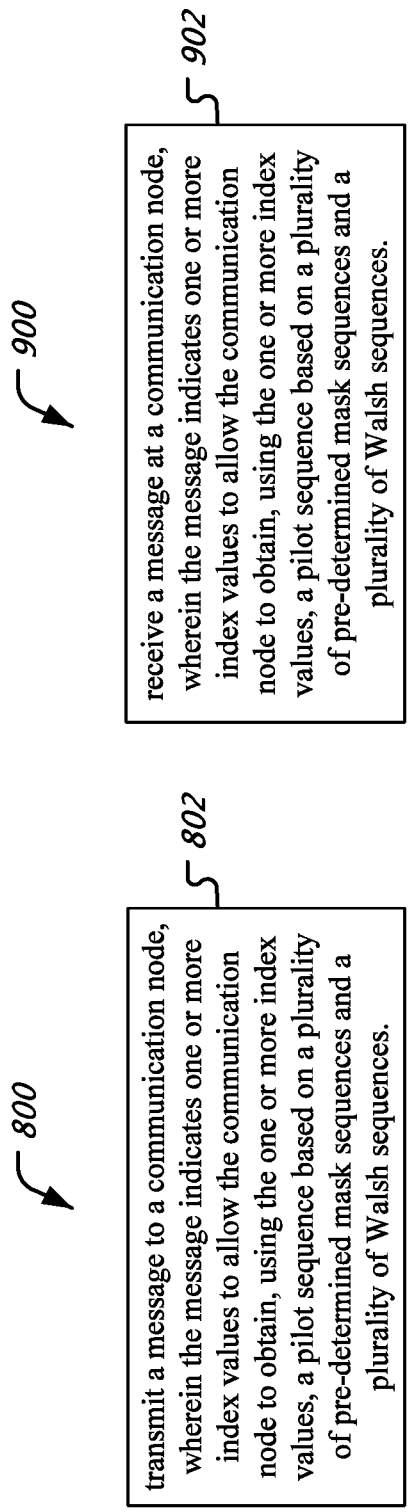
FIG. 8 is a flowchart representation of a method of wireless communication.
FIG. 9 is a flowchart representation of another method of wireless communication.

FIG. 8 is a flowchart representation of a method of wireless communication 800. The method 800 includes, at 802, transmitting a message to a communication node, wherein the message indicates one or more index values to allow the communication node to obtain, using the one or more index values, a pilot sequence based on a plurality of pre-determined mask sequences and a plurality of Walsh sequences.

FIG. 9 is a flowchart representation of a method of wireless communication 900. The method 900 includes, at 902, receiving a message at a communication node, wherein the message indicates one or more index values to allow the communication node to obtain, using the one or more index values, a pilot sequence based on a plurality of pre-determined mask sequences and a plurality of Walsh sequences.

FIG. 10 is a flowchart representation of a method of wireless communication 1000. The method 1000 includes, at 1002, determining, based on an identity of a communication node, one or more index values to allow the communication node to obtain, using the one or more index values, a pilot sequence based on a plurality of pre-determined mask sequences and a plurality of Walsh sequences.

It will be appreciated that the present document discloses techniques for generating pilot sequences that are orthogonal or substantially with each other. The disclosed techniques allow a communication node to obtain a larger number of pilot sequences than some of the traditionally used techniques, such as Walsh sequences. It will further be appreciated that using the generated sequences, code-domain orthogonality or substantial code-domain orthogonality of pilot transmissions of multiple UEs in a same cell or neighboring cells can be achieved.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   determining, by a communication node using a first index, a mask sequence from a plurality of pre-determined mask sequences, wherein the plurality of pre-determined mask sequences is determined based on permutations of values 1, −1, i, and −i or permutations of values 1+i, 1−i, −1+i, and −1−i;
   determining, by the communication node, a Walsh sequence using a second index, wherein the Walsh sequence has a same length as the mask sequence, and wherein the plurality of pre-determined mask sequences comprises:

$$Mask_{4\times 4} = \begin{Bmatrix} 1 & 1 & 1 & 1 \\ 1 & -i & i & 1 \\ 1 & -1 & -i & -1 \\ 1 & i & -1 & i \end{Bmatrix}, \quad (1)$$

wherein the Walsh sequence is determined based on a Walsh matrix $$Walsh(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

or $$Mask_{8\times 8} = \begin{Bmatrix} 1 & 1 & 1 & 1 & 1 & 1 & 1 & 1 \\ 1 & -i & 1 & -i & i & 1 & -i & -1 \\ 1 & -1 & -i & i & i & i & -1 & -1 \\ 1 & i & -i & 1 & 1 & -i & -i & -1 \\ 1 & 1 & i & -i & 1 & i & i & i \\ 1 & -i & i & -1 & 1 & 1 & 1 & -i \\ 1 & -1 & -1 & -1 & i & i & i & i \\ 1 & i & 1 & i & -i & -1 & -1 & i \end{Bmatrix}, \quad (2)$$

and
wherein the Walsh sequence is determined based on a Walsh matrix $$Walsh(8) = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix};$$

generating, by the communication node, a pilot sequence by performing element-wise multiplication of the mask sequence and the Walsh sequence; and performing, by the communication node, a wireless transmission using the pilot sequence.

2. The method of claim 1, wherein the first index or the second index is determined based on an identity of the communication node, the identity including a cell identity or a user equipment identity of the communication node.

3. The method of claim 1, wherein generating the pilot sequence includes generating a plurality of N pilot sequences, wherein the wireless transmission includes a plurality of data bits, and wherein the first index or the second index is determined based on a first log2(N) bits of the plurality of data bits.

4. A method of wireless communication, comprising:

transmitting, by a base station, a message to a communication node, wherein the message indicates one or more index values to allow the communication node to determine, using the one or more index values, a pilot sequence based on a plurality of pre-determined mask sequences and a plurality of Walsh sequences, wherein the plurality of pre-determined mask sequences is determined based on permutations of values 1, −1, i, and −i or permutations of values 1+i, or 1−i, or −1+i, or −1−i, wherein the plurality of pre-determined mask sequences comprises:

$$Mask_{4\times 4} = \begin{Bmatrix} 1 & 1 & 1 & 1 \\ 1 & -i & i & 1 \\ 1 & -1 & -i & -1 \\ 1 & i & -1 & i \end{Bmatrix}, \quad (1)$$

wherein the Walsh sequence is determined based on a Walsh matrix $$Walsh(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

or $$Mask_{8\times 8} = \begin{Bmatrix} 1 & 1 & 1 & 1 & 1 & 1 & 1 & 1 \\ 1 & -i & 1 & -i & i & 1 & -i & -1 \\ 1 & -1 & -i & i & i & i & -1 & -1 \\ 1 & i & -i & 1 & 1 & -i & -i & -1 \\ 1 & 1 & i & -i & 1 & i & i & i \\ 1 & -i & i & -1 & 1 & 1 & 1 & -i \\ 1 & -1 & -1 & -1 & i & i & i & i \\ 1 & i & -1 & i & -i & -1 & -1 & i \end{Bmatrix}, \quad (2)$$

wherein the Walsh sequence is determined based on a Walsh matrix $$Walsh(8) = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix},$$

wherein the pilot sequence is determined by element-wise multiplication of a mask sequence of the plurality of pre-determined mask sequences and a Walsh sequence of the plurality of Walsh sequences.

5. The method of claim 4, wherein the one or more index values are determined based on an identity of the communication node, the identity including a cell identity or a user equipment identity of the communication node.

6. The method of claim 4, wherein a plurality of N pilot sequences is generated, wherein the communication node is configured transmit a plurality of data bits, and wherein a first index or a second index is determined based on a first log2(N) bits of the plurality of data bits.

7. An apparatus for wireless communication, comprising:

a processor; and a memory including processor-executable instructions stored thereon, the processor-executable instructions, upon execution by the processor, configure the processor to:

determine, using a first index, a mask sequence from a plurality of pre-determined mask sequences, wherein the plurality of pre-determined mask sequences is determined based on permutations of values 1, −1, i, and −i or permutations of values 1+i, or 1−i, or −1+i, or −1−i;

determine a Walsh sequence using a second index, wherein the Walsh sequence has a same length as the mask sequence, wherein the plurality of pre-determined mask sequences comprises:

$$Mask_{4\times 4} = \begin{Bmatrix} 1 & 1 & 1 & 1 \\ 1 & -i & i & 1 \\ 1 & -1 & -i & -1 \\ 1 & i & -1 & i \end{Bmatrix}, \quad (1)$$

wherein the Walsh sequence is determined based on a Walsh matrix $$Walsh(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix};$$

or $$Mask_{8\times 8} = \begin{Bmatrix} 1 & 1 & 1 & 1 & 1 & 1 & 1 & 1 \\ 1 & -i & 1 & -i & i & 1 & -i & -1 \\ 1 & -1 & -i & i & i & i & -1 & -1 \\ 1 & i & -i & 1 & 1 & -i & -i & -1 \\ 1 & 1 & i & -i & 1 & i & i & i \\ 1 & -i & i & -1 & 1 & 1 & 1 & -i \\ 1 & -1 & -1 & -1 & i & i & i & i \\ 1 & i & -1 & i & -i & -1 & -1 & i \end{Bmatrix}, \quad (2)$$

wherein the Walsh sequence is determined based on a Walsh matrix $$Walsh(8) = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix};$$

generate a pilot sequence by performing element-wise multiplication of the mask sequence and the Walsh sequence; and perform a wireless transmission using the pilot sequence.

8. The apparatus of claim 7, wherein the first index or the second index is determined based on an identity of the apparatus, the identity including a cell identity or a user equipment identity of the apparatus.

9. The apparatus of claim 7, wherein generating the pilot sequence includes generating a plurality of N pilot sequences, wherein the wireless transmission includes a plurality of data bits, and wherein the first index or the second index is determined based on a first log2(N) bits of the plurality of data bits.

10. An apparatus for wireless communication, comprising:

a processor; and a memory including processor-executable instructions stored thereon, the processor-executable instructions, upon execution by the processor, configure the processor to:

transmit a message to a communication node, wherein the message indicates one or more index values to allow the communication node to obtain, using the one or more index values, a pilot sequence based on a plurality of pre-determined mask sequences and a plurality of Walsh sequences, wherein the plurality of pre-determined mask sequences is determined based on permutations of values 1, −1, i, and −i or permutations of values 1+i, or 1−i, or −1+i, or −1−i, wherein the plurality of pre-determined mask sequences comprises:

$$Mask_{4\times 4} = \begin{Bmatrix} 1 & 1 & 1 & 1 \\ 1 & -i & i & 1 \\ 1 & -1 & -i & -1 \\ 1 & i & -1 & i \end{Bmatrix}, \quad (1)$$

and wherein the Walsh sequence is determined based on a Walsh matrix $$Walsh(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix};$$

or $$Mask_{16\times16} = \begin{Bmatrix} 1 & 1 & 1 & 1 & 1 & 1 & 1 & 1 & 1 & 1 & 1 & 1 & 1 & 1 & 1 & 1, \\ 1 & -i & 1 & -i & -i & -1 & -i & -1 & i & 1 & -i & -1 & -1 & i & 1 & -i, \\ 1 & -1 & 1 & -1 & i & -i & -i & i & i & i & -i & -i & 1 & 1 & 1 & 1, \\ 1 & i & 1 & i & -1 & -i & 1 & i & 1 & -i & 1 & -i & -1 & i & 1 & -i, \\ 1 & 1 & -i & -i & i & -i & -1 & 1 & -1 & 1 & -i & i & i & i & 1 & 1, \\ 1 & -i & -i & -1 & -1 & -i & -i & 1 & -i & 1 & -1 & -i & i & 1 & -1 & i, \\ 1 & -1 & -i & i & 1 & 1 & -i & -i & -i & i & -1 & 1 & -i & -i & -1 & -1, \\ 1 & i & -i & 1 & -i & -1 & -1 & i & -1 & -i & -i & 1 & -i & -1 & 1 & -i, \\ 1 & 1 & i & -i & i & -i & 1 & 1 & -i & i & -1 & -1 & 1 & 1 & i & -i, \\ 1 & -i & i & -1 & -1 & -i & i & 1 & -1 & -i & -i & -1 & -1 & i & i & -1, \\ 1 & -1 & i & i & 1 & 1 & i & -i & -1 & 1 & -i & -i & 1 & 1 & i & -i, \\ 1 & i & i & 1 & -i & -1 & 1 & i & -i & 1 & -1 & i & -1 & i & i & -1, \\ 1 & 1 & -1 & 1 & 1 & 1 & -1 & 1 & i & i & -i & i & -i & -i & i & -i, \\ 1 & -i & -1 & -i & -i & -1 & i & -1 & 1 & -i & 1 & i & -i & -1 & -i & 1, \\ 1 & -1 & -1 & -1 & i & -i & i & i & 1 & 1 & 1 & -1 & i & i & -i & i, \\ 1 & i & -1 & i & -1 & -i & -1 & i & i & 1 & -i & 1 & i & 1 & i & -1 \end{Bmatrix},$$ (2)

wherein the Walsh sequence is determined by computing Hadamard matrices recursively; and wherein the pilot sequence is determined by element-wise multiplication of a mask sequence of the plurality of pre-determined mask sequences and a Walsh sequence of the plurality of Walsh sequences.

11. The apparatus of claim 10, wherein the one or more index values are determined based on an identity of the communication node, the identity including a cell identity or a user equipment identity of the communication node.

12. The apparatus of claim 10, wherein a plurality of N pilot sequences is generated, wherein the communication node is configured transmit a plurality of data bits, and wherein a first index or a second index is determined based on a first log2(N) bits of the plurality of data bits.

* * * * *